United States Patent
Cornett et al.

(10) Patent No.: US 8,949,382 B2
(45) Date of Patent: Feb. 3, 2015

(54) SYSTEMS, DEVICES, AND METHODS FOR NETWORK WIZARDS

(75) Inventors: James W. Cornett, Bluff City, TN (US); Gregory J. Karklins, Johnson City, TN (US)

(73) Assignee: Siemens Industry, Inc., Alpharetta, GA (US)

( * ) Notice: Subject to any disclaimer, the term of this patent is extended or adjusted under 35 U.S.C. 154(b) by 2345 days.

(21) Appl. No.: 10/781,170

(22) Filed: Feb. 18, 2004

(65) Prior Publication Data

US 2004/0165544 A1 Aug. 26, 2004

Related U.S. Application Data

(60) Provisional application No. 60/450,098, filed on Feb. 26, 2003.

(51) Int. Cl.
 *G06F 15/177* (2006.01)
(52) U.S. Cl.
 USPC .......................................................... 709/220
(58) Field of Classification Search
 USPC ............................. 709/220; 370/254; 713/100
 See application file for complete search history.

(56) References Cited

U.S. PATENT DOCUMENTS

| | | | | |
|---|---|---|---|---|
| 5,983,269 A * | 11/1999 | Mattson et al. | ................ | 709/221 |
| 6,237,054 B1 * | 5/2001 | Freitag, Jr. | ...................... | 710/72 |
| 6,446,202 B1 * | 9/2002 | Krivoshein et al. | ................ | 713/1 |
| 6,449,715 B1 * | 9/2002 | Krivoshein | ........................ | 713/1 |
| 6,502,234 B1 * | 12/2002 | Gauthier et al. | ............... | 717/107 |
| 6,925,158 B2 * | 8/2005 | McNutt | ........................ | 379/93.34 |
| 7,058,693 B1 * | 6/2006 | Baker, Jr. | ........................ | 709/217 |
| 7,124,206 B2 * | 10/2006 | Hausman | ........................ | 709/250 |
| 7,343,004 B2 * | 3/2008 | Fulton et al. | ................ | 379/88.14 |
| 7,590,712 B2 * | 9/2009 | Chambers et al. | ............ | 709/223 |
| 7,890,212 B2 * | 2/2011 | Cornett et al. | ................. | 700/264 |
| 2001/0014833 A1 * | 8/2001 | Brault | ............................. | 700/18 |
| 2003/0036875 A1 * | 2/2003 | Peck et al. | ..................... | 702/127 |
| 2005/0132064 A1 * | 6/2005 | Lo | .................................. | 709/227 |

FOREIGN PATENT DOCUMENTS

JP 11175114 A * 7/1999

OTHER PUBLICATIONS

Tech Note 275, Configuring TCP/IP Industrial Ethernet with Simatic Net Version 6.0 and Generic NIC Card (e.g. 3Com Card), Oct. 2002, Invensys Systems, pp. 1-20.*
Control Systems International, Configuring Siemens CP-143, 2002, Control Systems International, pp. 1-12.*

* cited by examiner

*Primary Examiner* — Esther Benoit

(57) ABSTRACT

Certain exemplary embodiments comprise a method for configuring a network interface device. The network interface device can be adaptable to connect a programmable logic controller to a network. The method can comprise automatically enforcing, via a wizard, user compliance with a plurality of predetermined steps for a computer-assisted configuration of the network interface device. The computer-assisted configuration of the network interface device can relate to an OSI transport layer or above. The method can comprise receiving at least one setting associated with a network connection for the network interface device.

27 Claims, 5 Drawing Sheets

5000

Configuration Wizard
  Use this for the initial configuration of a
  network interface device This wizard will help you configure the
network interface device in order to
connect to a non-process network To configure the network interface
device specify the device's position
relative to the programmable logic
controller. Click 'read modules' to
search for the installed network
interface device Module Position

| | ⇧ 5450 | Read Modules |
| 5400 | ⇩ 5475 | 5500 |

| Position | Module ID |
|---|---|
| 5650 | 5675 |

5600

5300

5200

| < Back 5700 | Next > 5800 | Cancel 5900 |

SYSTEMS, DEVICES, AND METHODS FOR NETWORK WIZARDS

CROSS-REFERENCES TO RELATED APPLICATIONS

This application claims priority to, and incorporates by reference herein in its entirety U.S. Provisional Patent Application Ser. No. 60/450,098, filed 26 Feb. 2003.

BACKGROUND

U.S. Pat. No. 6,061,603 (Papadopoulos), which is incorporated by reference herein in its entirety, allegedly cites a "control system allows a user to access a programmable logic controller (PLC) system over a communication network such as an Internet network using a web browser. The system includes an Internet web interface between the network and the programmable logic controller. The Web interface serves Web pages from an Ethernet interface on a PLC and includes an HTTP protocol interpreter and a TCP/IP stack. The Web interface provides access to the PLC by a user at a remote location through the Internet. The interface translates the industry standard Ethernet, TCP/IP and HTTP protocols used on the Internet into data recognizable to the PLC. Using this interface, the user can retrieve all pertinent data regarding the operation of the programmable logic controller system." See Abstract.

U.S. Pat. No. 5,805,442 (Crater), which is incorporated by reference herein in its entirety, allegedly cites an "integrated control system comprises one or more controllers each equipped to perform a control function and to gather data (ordinarily from sensors) relevant to the control function. Each controller contains computer storage means, such as computer memory, for storing the relevant data and instructions, associated with the data, for causing a remote computer to generate a visual display incorporating the data in a predetermined format; and a communication module for establishing contact and facilitating data interchange with the remote computer. The remote computer, in turn, also includes a communication module compatible with the controller-borne module, and which enables the remote computer to download the data and associated instructions from one or more controllers. The remote computer also includes a facility for processing the instructions to create a user interface encoded by the instructions, and which incorporates the data. In this way, controller data is coupled to instructions for displaying that data, and this totality of information is continuously accessible, on a freely selective basis, to the remote computer." See Abstract.

U.S. Pat. No. 5,987,611 (Freund), which is incorporated by reference herein in its entirety, allegedly cites a "computing environment with methods for monitoring access to an open network, such as a WAN or the Internet, is described. The system includes one or more clients, each operating applications or processes (e.g., Netscape Navigator™ or Microsoft Internet Explorer™ browser software) requiring Internet (or other open network) access (e.g., an Internet connection to one or more Web servers). Client-based monitoring and filtering of access is provided in conjunction with a centralized enforcement supervisor. The supervisor maintains access rules for the client-based filtering and verifies the existence and proper operation of the client-based filter application. Access rules which can be defined can specify criteria such as total time a user can be connected to the Internet (e.g., per day, week, month, or the like), time a user can interactively use the Internet (e.g., per day, week, month, or the like), a list of applications or application versions that a user can or cannot use in order to access the Internet, a list of URLs (or WAN addresses) that a user application can (or cannot) access, a list of protocols or protocol components (such as Java Script™) that a user application can or cannot use, and rules to determine what events should be logged (including how long are logs to be kept). By intercepting process loading and unloading and keeping a list of currently-active processes, each client process can be checked for various characteristics, including checking executable names, version numbers, executable file checksums, version header details, configuration settings, and the like. With this information, the system can determine if a particular process in question should have access to the Internet and what kind of access (i.e., protocols, Internet addresses, time limitations, and the like) is permissible for the given specific user." See Abstract.

U.S. patent application Ser. No. 20020070965 (Austin), which is incorporated by reference herein in its entirety, allegedly cites a "system and method for enabling a program to subscribe to data and/or publish data, e.g., in order to receive and display data from a data source in a graphical user interface (GUI) element or in order to write data associated with a GUI element to a data target. In one embodiment, a developer of a program may specify a data source and/or data target during development of the program, e.g., via a URL. If a data source is specified, the method may operate to automatically determine a GUI element operable to display (or otherwise indicate) data received from the data source and may automatically include the GUI element in the program's graphical user interface (GUI) and automatically configure the GUI element to receive and display data from the specified data source during execution of the program. In the preferred embodiment, the developer is not required to specify any source code for the program in performing this configuration. Many programs require data to be exchanged with various types of data sources and targets, but this data exchange is often a difficult task for developers. Thus, various embodiments of the invention may greatly benefit users by enabling complicated exchange of data to be performed by simply specifying a data source and/or target to associate with a GUI element. Another embodiment of the invention enables the implementation of a data viewer program which, when executed, enables an end user to specify a data source, e.g., via a URL, and view data received from the data source, wherein the end user may specify any of various types of data sources, any of various types of data may be received from the data sources, and any of various types of GUI elements may be dynamically displayed to allow the end user to view the received data." See Abstract.

U.S. patent application Ser. No. 20020174178 (Stawikowski), which is incorporated by reference herein in its entirety, allegedly cites a "[c]ommunication system on an IP network (50) between automation equipment (10) capable of executing at least one program (20) to provide automation functions and one or more remote items of equipment (30, 40) executing one or several computer applications. The communication system is conform with the WSDL (Web Services Description Language) language and provides monitoring, display, control, configuration or programming functions of the automation equipment (10) to remote equipment. The communication system uses at least one service description document (61) conform with the WSDL language accessible through a URL address and that describes capabilities of one or several WEB services (21, 21') capable of interacting with a program (20) on the automation equipment (10)." See Abstract.

U.S. patent application Ser. No. 20020046239 (Stawikowski), which is incorporated by reference herein in its entirety, allegedly cites the "present invention describes a communication system on an IP network (50) between an automation equipment (10) and one or more remote devices (30). The communication system is based on the Simple Object Access Protocol (SOAP) for the purpose of providing the remote device (30) with automation equipment (10) supervision, display, control, configuration or programming functions. The automation equipment (10) comprises at least one WEB service (21) and/or one WEB client (22) able to interact with a program (20) of the automation equipment (10), capable of decoding messages received (51, 54) from the IP network (50) encoded according to the SOAP protocol and capable of encoding messages to be sent (52, 53) according to the SOAP protocol. A service description document (61), accessible to a remote device (30, 30") describes the capacities of one or more WEB services (21) implanted in an automation equipment (10). This document may be stored or constructed dynamically by a generator (62)." See Abstract.

U.S. patent application Ser. No. 20020120723 (Forth), which is incorporated by reference herein in its entirety, allegedly cites a "system for modifying the functionality of intelligent electronic devices installed and operating in the field is disclosed. Each of the intelligent electronic devices operates with a software configuration to monitor electrical energy. A copy of the software configurations may be maintained in a database. Changes to the operation of one or more of the intelligent electronic devices may be made as a function of modifications to the database." See Abstract.

U.S. patent application Ser. No. 20020152289 (Dube), which is incorporated by reference herein in its entirety, allegedly cites a "system and method for configuring a resource in a network is disclosed. The system is accessible by a web tool and includes a configuration database being capable of storing a plurality of parameters for configuring the resource. A configuration page also accessible via the web tool, includes a form to facilitate configuration of the resource. The form is capable of receiving a resource parameter entry and a configuration option selection. The configuration option selection and the resource parameter entry compose a magic-URL. A configuration agent is responsive to the magic-URL wherein the agent and the magic-URL cooperate to manage the configuration database." See Abstract.

U.S. Pat. No. 6,640,140 (Lindner), which is incorporated by reference herein in its entirety, allegedly cites a "programmable logic controller for use as part of an industrial control system or as part of an automated system and a corresponding method, the controller including an interface to the Internet, and including a web server allowing a remote computer to access web pages maintained by the controller providing information relevant to the control function of the controller such as control sensor readings and, optionally, information about the status of the control system. The web server is implemented as part of the controller in such a way that the controller scan rate (the rate at which the ladder logic for all associated control system devices is repeated) is unaffected by execution of the web server." See Abstract.

SUMMARY

Certain exemplary embodiments comprise a method for configuring a network interface device. The network interface device can be adaptable to connect a programmable logic controller to a network. The method can comprise automatically enforcing, via a wizard, user compliance with a plurality of predetermined steps for a computer-assisted configuration of the network interface device. The computer-assisted configuration of the network interface device can relate to an OSI transport layer or above. The method can comprise receiving at least one setting associated with a network connection for the network interface device.

BRIEF DESCRIPTION OF THE DRAWINGS

A wide variety of potential embodiments will be more readily understood through the following detailed description, with reference to the accompanying drawings in which:

FIG. 5 is a block diagram of an exemplary embodiment of a graphic user interface screen 5000.

DEFINITIONS

Figure 1:
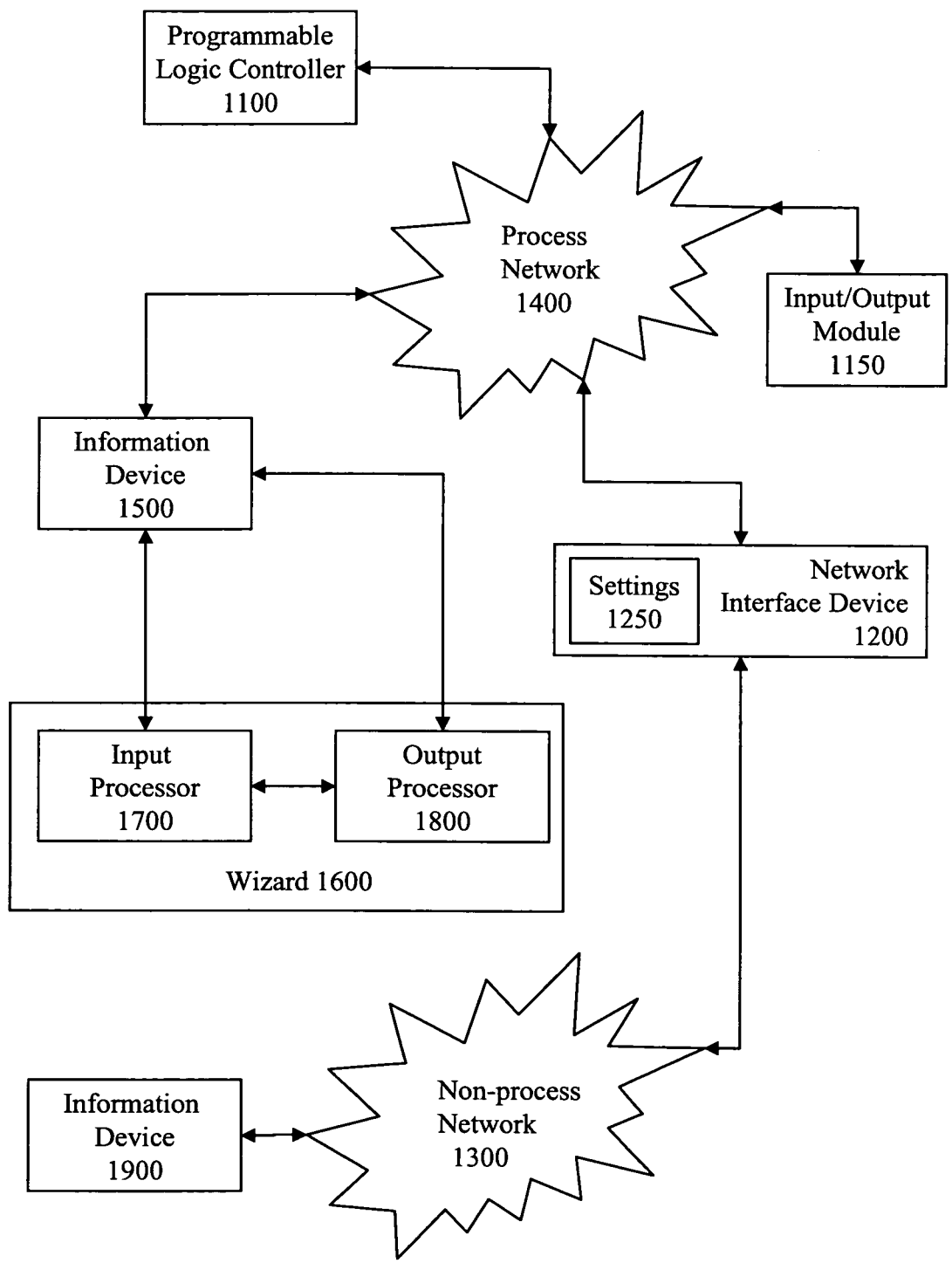
FIG. 1 is a block diagram of an exemplary embodiment of a programmable logic controller system 1000.

When the following terms are used herein, the accompanying definitions apply:

above—at a higher level, e.g. the session layer, the presentation layer, and the application layer are above the transport layer in the OSI model.

address—a name or number used for identification in information storage or retrieval.

administration—management and/or control.

application layer—a layer in the OSI model that supports application and/or end-user processes. The application layer can handle issues like network transparency, resource allocation, and/or problem partitioning, etc. The application layer can be concerned with the user's view of the network (e.g. formatting electronic mail messages). Communication partners can be identified, quality of service can be identified, user authentication and privacy can be considered, and any constraints on data syntax can be identified. This layer can provide application services for file transfers, e-mail, and other network software services. Telnet and FTP are applications that exist at the application level. Tiered application architectures can be part of this layer. Protocols used in the application layer comprise DNS, FTP, TFTP, BOOTP, SNMP, RLOGIN, SMTP, MIME, NFS, FINGER, TELNET, NCP, APPC, AFP, and SMB, etc.

automatically—acting or operating in a manner essentially independent of external influence or control. For example, an automatic light switch can turn on upon "seeing" a person in its view, without the person manually operating the light switch.

client—a computer or program that can, from a server, download files for manipulation, monitor, run applications, and/or request application-based services, etc.

communication—an exchange of information.

compliance—acting in a limited, predefined, or expected manner.

computer assisted configuration—using hardware, firmware, and/or software to set up a system or an element thereof for use.

configuration program—hardware, firmware, and/or software that changes the way in which a component and/or system is configured.

connection—a physical and/or logical link between two or more points in a system. For example, a wire, an optical fiber, a wireless link, and/or a virtual circuit, etc.

count—a defined quantity.

couple—to join, connect, and/or link two things together.

data—distinct pieces of information, usually formatted in a special or predetermined way.

data link layer—a layer in the OSI model wherein data packets are encoded and decoded into bits. The data link layer can furnish transmission protocol knowledge and management. The data link layer can handle errors in the physical layer, flow control, and/or frame synchronization, etc. The data link layer can be divided into two sublayers: The Media Access Control (MAC) layer and the Logical Link Control (LLC) layer. The MAC sublayer can control how a computer on the network gains access to the data and permission to transmit it. The LLC layer can control frame synchronization, flow control, and/or error checking, etc.

e-mail—a communication comprising addressable messages, to sender-chosen recipients, transmittable electronically over a computer network.

enforcing—requiring compliance and/or preventing non-compliance with a predetermined action and/or rule.

ethernet—a type of networking technology.

firmware—machine-readable instructions that are stored in a read-only memory (ROM). ROM's can comprise PROMs and EPROMs.

FTP—a communications protocol for transferring files from one computer to another over a network.

haptic—both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

help utility—documentation relating to a computer program available to a user of an information device.

HTTP—a protocol used to request and/or transmit files, such as web pages and web page components, over the Internet or other computer network. The HTTP protocol operates at or above the transport layer of the OSI model.

information—data.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or graphical user interface described herein may be used as an information device. An information device can include well-known components such as one or more network interfaces, one or more processors, one or more memories containing instructions, and/or one or more input/output (I/O) devices, one or more user interfaces, etc.

input—a signal, data, and/or information provided to a processor.

input/output module—a configurable device used as an interface between a PLC and devices communicatively couplable to the PLC.

input processor—a processor adapted to prompt a user for, and receive from a user, information related to at least one setting of a network interface device.

Internet—a globally interconnected system of data networks.

I/O device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

logical position—a placement relative to other elements, a sequential identification.

login services—information, e.g., a user name and/or password associated with gaining access to restricted resources.

memory device—any device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted to be executed by the processor according to an embodiment disclosed herein.

message—a communication.

name—a sequence of one or more characters that uniquely identifies a file, variable, account, or other entity.

network—two or more information devices that are linked to share resources (such as printers or CD-ROMs), exchange files, or allow electronic communications therebetween. Information devices on a network can be linked through various wireline or wireless media, such as cables, telephone lines, power lines, optical fibers, radio waves, light beams, etc.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

network interface device—a device adaptable to communicatively couple an information device to other devices connectable to a network. For example, a telephone, a cellular phone, a cellular modem, a telephone data modem, a fax modem, a wireless transceiver, an ethernet card, a cable modem, a digital subscriber line interface, a bridge, a hub, a router, and/or other similar device, etc.

network layer—a layer in the OSI model that provides switching and/or routing. For example, the network layer can provide logical paths, known as virtual circuits, for transmitting data from node to node. Functions of this layer can include routing, forwarding, addressing, internetworking, error handling, congestion control, and/or packet sequencing.

OSI model—a general functional model for computer and/or data network architecture developed by the International Standards Organization (ISO). The OSI model can be useful as a framework for international standards in heterogeneous computer network architecture. The OSI model can be logically partitioned into seven layers, namely, from lowest to highest: 1) physical layer, 2) data link layer, 3) network layer, 4) transport layer, 5) session layer, 6) presentation layer, 7) application layer. Functional equivalents to these layers are considered included in this definition.

output processor—a processor adapted to provide at least one setting to a configurable network interface device.

physical layer—a layer in the OSI model that physically conveys the bit stream as a signal (e.g., electrical, light, and/or radio, etc.) through a network. The physical layer can provide the hardware means (e.g., cables, cards, transmitter, and/or receiver, etc.) of transmitting data.

predetermined steps—a series of sequential actions, established in advance, to achieve a goal.

presentation layer—a layer in the OSI model that provides independence from differences in data representation (e.g., encryption) by translating from application to network format, and vice versa. The presentation layer can transform data into the form that the application layer can accept. This layer can format and/or encrypt data to be sent across a network, providing freedom from compatibility problems. The presentation layer can sometimes be called the syntax layer.

process data—information related to an industrial application using a PLC.

processor—a device for processing machine-readable instruction. A processor can be a central processing unit, a local processor, a remote processor, parallel processors, and/or distributed processors, etc. The processor can be a general-purpose microprocessor, such the Pentium III series of microprocessors manufactured by the Intel Corporation of Santa Clara, Calif. In another embodiment, the processor can be an Application Specific Integrated Circuit (ASIC) or a Field Programmable Gate Array (FPGA) that has been designed to implement in its hardware and/or firmware at least a part of an embodiment disclosed herein.

programmable logic controller (PLC)—a device used to automate monitoring and/or control of an industrial plant and/or process. A PLC follows programmed instructions to provide automated monitoring and/or control functions for a machine and/or process by evaluating a set of inputs. A PLC can be applied in uses comprising materials conveying, materials pumping, materials manufacturing, electrical power generation, electrical power distribution, heating systems, ventilating systems, air conditioning systems, chemical processing, mining, machining, packaging, and/or materials distribution, etc. A PLC can be communicatively coupled with a first network of non-information devices such as sensors and/or actuators. A PLC can be communicatively coupled with a second network of information devices.

Q-address—an identification index of a module attachable to a PLC.

server—an information device and/or software that provides some service for other connected information devices via a network.

session layer—a layer in the OSI model that establishes, manages, and terminates connections between applications. The session layer can set up, coordinate, and/or terminate conversations, exchanges, and/or dialogues between the applications at each end. The session layer can deal with session and connection coordination.

setting—a value for a characteristic or feature adjustable for proper and/or optimal functioning.

SMTP—an acronym meaning Simple Mail Transfer Protocol. SMTP is used by many e-mail applications.

transfer—a transmission from one device to another.

transport layer—a layer in the OSI model that provides transparent transfer of data between end systems, or hosts, and can be responsible for end-to-end error recovery and flow control. The transport layer can ensure complete data transfer.

type—a number of things having in common traits or characteristics that distinguish them as a group or class.

user—any person, organization, process, device, program, protocol, and/or system that uses a device and/or service.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

validate—to establish the soundness of, e.g. to determine whether a network address is appropriate for communications.

wizard—hardware, firmware, and/or software adaptable to guide a user through predetermined sequential steps of a task.

DETAILED DESCRIPTION

FIG. 1 is a block diagram of an exemplary embodiment of a programmable logic controller system 1000. In certain exemplary embodiments, system 1000 can comprise a programmable logic controller (PLC) 1100. PLC 1100 can be communicatively couplable to a process network 1400. Process network 1400 can relate to an industrial application, such as, materials conveying, materials pumping, materials manufacturing, electrical power generation, electrical power distribution, heating systems, ventilating systems, air conditioning systems, chemical processing, mining, machining, packaging, and/or materials distribution, etc. Process network 1400 can be communicatively couplable to non-information devices such as sensors and/or actuators. Process network 1400 can be communicatively couplable an input/output module 1150. Input/output module 1150 can be adaptable to communicatively couple non-information devices such as sensors and/or actuators to PLC 1100 via process network 1400. Process network 1400 can be communicatively couplable to an information device 1500.

Process network 1400 can be communicatively couplable to a non-process network 1300 via a network interface device 1200, which can comprise settings 1250. Among other things, settings 1250 can comprise an identification moniker, a password, a connection type, a memory address, a FTP setting, a HTTP setting, a SMTP server address, an e-mail address, a SMTP server port, a specification of process data to be communicated via e-mail, a specification of process data to be communicated via FTP, a specification of process data to be communicated via HTTP, a FTP address, and/or a HTTP address, etc.

Based on input provided by a user to information device 1500, a wizard 1600 can be adaptable to configure, and/or cause information device 1500 to configure, network interface device 1200. In certain exemplary embodiments, information device 1500 can be directly communicatively couplable to network interface device 1200 without using process network 1400. In certain exemplary embodiments, information device 1500 can be communicatively couplable to network interface device 1200 via non-process network 1300. Wizard 1600 can configure network interface device 1200 via a series of predetermined steps. Wizard 1600 can comprise an input processor 1700 and an output processor 1800.

Wizard 1600 can query a user for inputs related to settings for network interface device 1200 via input processor 1700. Input processor 1700 can be adaptable to accept user inputs related to settings for network interface device 1200. Based at least in part on input provided by the user to input processor 1700, the output processor of wizard 1600 can automatically provide settings for network interfaced device 1200. Wizard 1600 can query the user for confirmation of the settings.

In certain exemplary embodiments, output processor 1800 can provide settings obtained from the user. In certain exemplary embodiments, output processor 1800 can provide settings obtained via calculation and/or from data found from searching sources such as information device 1500 or a memory device couplable to non-process network 1300.

In certain exemplary embodiments, wizard 1600 can be adaptable to validate at least one setting used in the configuration of network interface device 1200. Wizard 1600 can, for example, validate the address of a device specified as an FTP server, validate the address of a device specified as an FTP client, validate the address of a device specified as an HTTP server, and/or validate the address of a device specified as an SMTP server, etc.

In certain exemplary embodiments, non-process network 1300 can be an ethernet network. In certain exemplary embodiments, non-process network 1300 can be an UDP-based network, a TCP-based network, and/or the Internet. In certain exemplary embodiments, non-process network 1300 can be a non-ethernet local and/or wide area network. Network interface device 1200 can be an information device adaptable to function as a client and/or a server on non-process network 1300. An information device 1900 can be communicatively couplable to non-process network 1300. Information device 1900 can be communicatively couplable to process network 1400, such as via network interface device 1200 and/or non-process network 1300.

Figure 2:
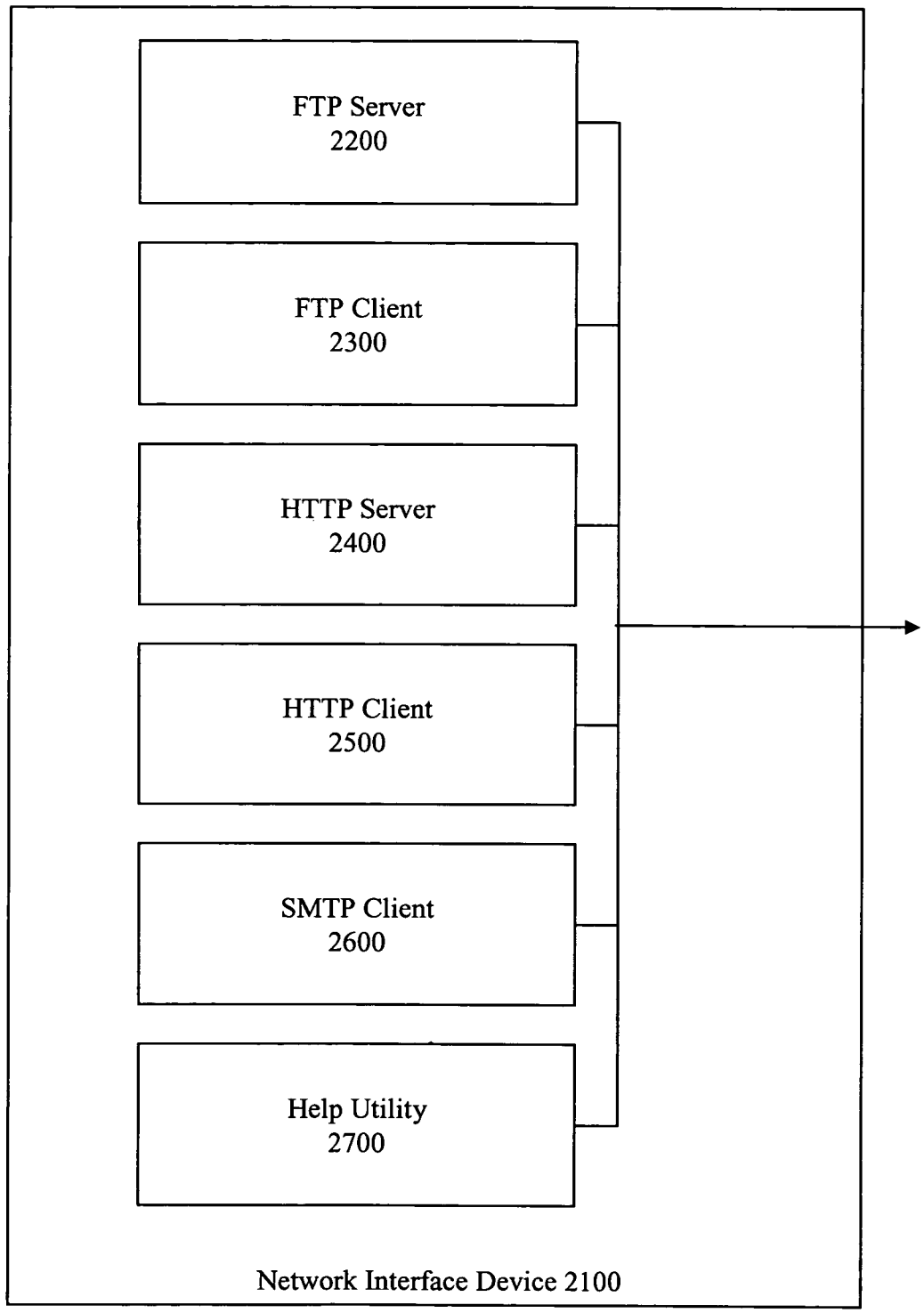
FIG. 2 is a block diagram of an exemplary embodiment of a network interface system 2000.

FIG. 2 is a block diagram of an exemplary embodiment of a network interface device and/or system 2000, which can be an information device. Network interface system 2000 can be adaptable to comprise an FTP server 2200, which can be adaptable to transfer files via an FTP protocol. FTP server 2200 can be adaptable to secure data by requiring, for example, a user name and password before allowing files to be transferred. Files transferred via FTP server 2200 can comprise process-related information from a PLC and/or process control program related information transmittable from the PLC, etc.

Network interface system 2000 can comprise an FTP client 2300, which can be adaptable to obtain information from a connected information device, such as a PLC. In certain exemplary embodiments, FTP client 2300 can be adaptable to receive information from a connected FTP server. FTP client 2300 can comprise information, such as a user name and password, for accessing information via an FTP protocol transfer. FTP client 2300 can be adaptable to delete files from the FTP server.

Network interface system 2000 can comprise an HTTP server 2400, which can be a secure server wherein information access requires authentication, such as, a user name and/or password. HTTP server 2400 can provide information to Internet users related to the PLC and/or an industrial process controllable by the PLC. HTTP server 2400 can be adaptable to allow administration of the PLC by the user connecting to the PLC via HTTP server 2400.

Network interface system 2000 can comprise an HTTP client 2500, which can be communicatively couplable to a secure server wherein information access requires authentication, such as, a user name and password. HTTP client 2500 can provide information to the PLC from Internet users related to a PLC and/or an industrial process controllable by a PLC. HTTP client 2500 can be adaptable to allow administration of the PLC by the user connecting to the PLC via an HTTP server.

Network interface system 2000 can comprise an SMTP client 2500, which can be adaptable to generate, cancel, and/or send e-mail messages and/or alerts. SMTP client 2500 can comprise lists of e-mail addresses. SMTP client 2500 can comprise a list of predefined rules for generating e-mail messages. SMTP client 2500 can, for example, generate messages responsive to PLC status information, PLC maintenance, PLC error messages, unusual conditions related to the PLC and/or an industrial process controllable by the PLC, etc. In certain exemplary embodiments, e-mail messages sent via SMTP client 2500 can comprise process data obtainable by the PLC.

In certain exemplary embodiments, network interface system 2000 can comprise a help utility 2600, which can provide the user with information regarding network interface system 2000, FTP server 2200, FTP client 2300, HTTP server 2400, and/or SMTP server 2500, etc. Help utility 2600 can assist the user in configuring and/or using network interface system 2000 and/or a PLC system communicatively coupled thereto.

Figure 3:
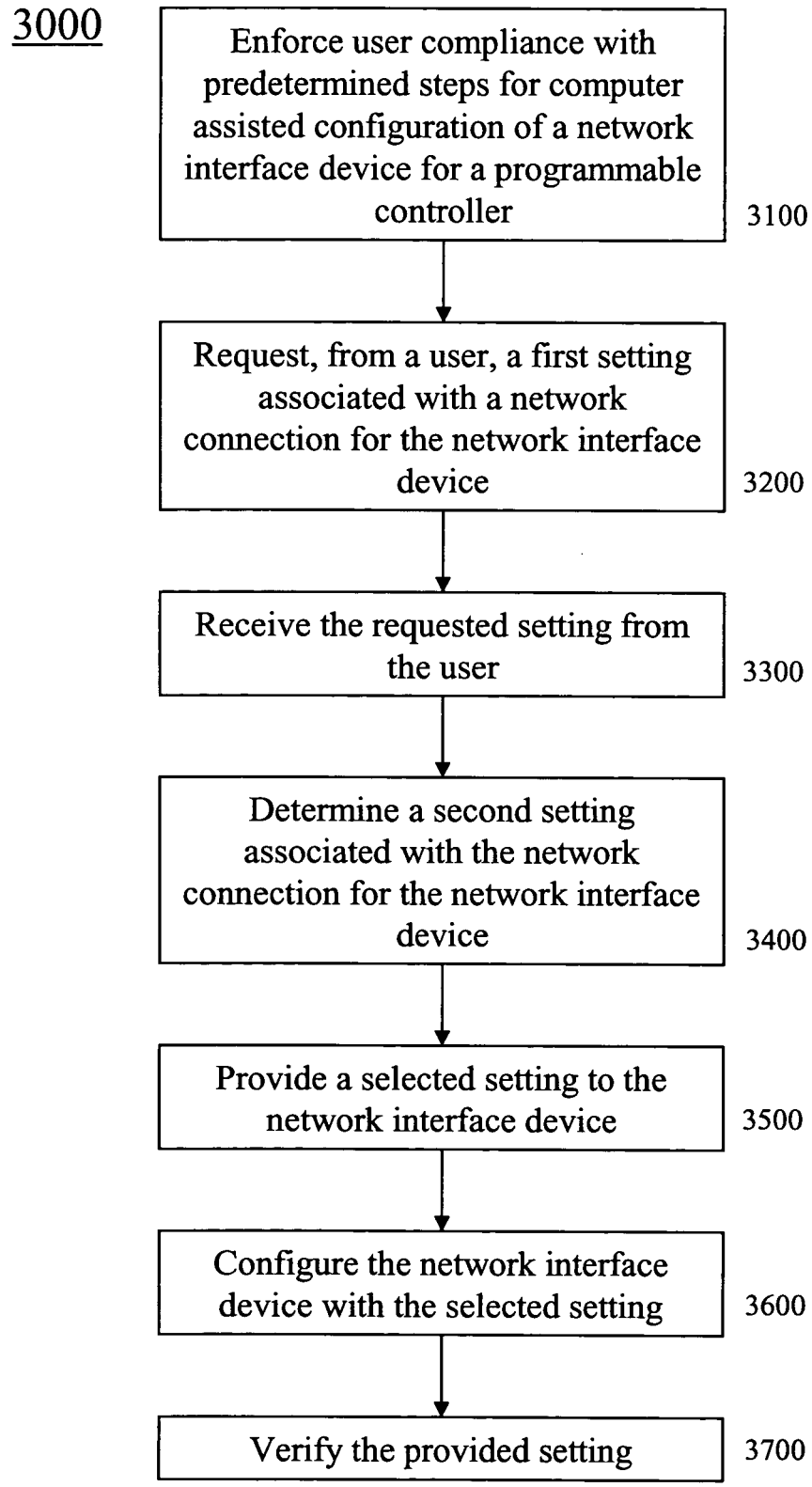
FIG. 3 is a flow diagram of an exemplary embodiment of a method of configuring a network interface device 3000.

FIG. 3 is a flow diagram of an exemplary embodiment of a method 3000 of configuring a network interface device and/or system. At activity 3100, user compliance with predetermined steps for a computer-assisted configuration of a network interface device can be enforced. The predetermined steps can be enforced via a wizard. The wizard can provide a graphical user interface for requesting settings for the network interface device. In certain exemplary embodiments, the computer-assisted configuration can relate to an OSI transport layer or above. That is, the computer-assisted configuration can relate to an OSI transport layer, or to any layer above the transport layer in the OSI model.

At activity 3200, a first setting associated with the network interface device can be requested. The first setting can be requested from a user of an information device via the wizard querying the user. The first setting can be associated with a network connection for the network interface device.

At activity 3300, the requested first setting associated with the network interface device can be received. The setting can be received from the user of the information device responsive to the wizard query of the user. In certain exemplary embodiments, the setting can be a logical position of the network interface device relative to the programmable controller, a count of network connections, a type of network connection, a Q-address used by an input/output module, an IP address, a subnet mask, a gateway address, a communications connection type, and/or a request for an automatic assignment of the IP address, etc.

Receiving the logical position of the network interface device can allow the wizard to properly communicate the logical position to, for example, the PLC. Receiving the logical position of the network interface device can allow the PLC and/or the information device to use and communicate with the network interface device. Using the logical position setting can allow the information device to, for example, provide and/or receive an identification moniker for the network interface device.

A network connection can be a logical peer-to-peer connection. The count of network connections can provide information indicative of all connections and/or services related to the network interface device. A count of network connections can provide the user with information adaptable to assist in the configuration of the network interface device. The wizard can be adaptable to enforce user compliance with predetermined steps for computer assisted configuration of each network interface device connection. The wizard can request settings of each connection such as, for example, whether the connection is for a client or a server, whether an automatic data transfer is specified for reading from a remote server, whether the automatic data transfer is specified for writing to a remote server, a specified amount of data for the automatic transfer, source location for the automatic data transfer, a destination for the automatic data transfer, a symbolic name for the automatic data transfer, and/or a symbolic name for each connection, etc.

Receiving a type of network connection can provide information adaptable to assist in the configuration of the network interface device. The type of network connection can be, for example, an e-mail connection, an FTP connection, and/or an HTTP connection, etc. The network interface device can use the Q-address to request specific information from the PLC related to the input/output module having the Q-address.

At activity 3400, a second setting associated with the network interface device can be determined. The second setting can be associated with a network connection for the network interface device. In certain exemplary embodiments, the setting can be determined responsive to a user input related to the setting. In certain exemplary embodiments, the wizard can search for the setting on a connectable memory device.

At activity 3500, a selected setting, such as the first and/or second setting, can be provided to the network interface device. The setting can be adaptable to communicatively couple the network interface device to other devices on a network. In certain exemplary embodiments, the setting can be adaptable to communicatively couple the network interface device to the Internet.

At activity 3600, the network interface device can be configured with the selected setting. The selected setting can be communicable to the network interface device.

At activity 3700, the setting provided to the network interface device, and/or the current configuration of the network interface device, can be verified. The wizard can be adaptable, for example, to verify: the logical position of the network interface device relative to the programmable controller, an IP address assigned to the network interface device, a subnet mask assigned to the network interface device, an IP address of an FTP server, a HTTP address, and/or an IP address of an SMTP server, etc. In certain exemplary embodiments, address settings can be verified by comparing settings to predetermined formats and/or ranges for valid settings. In certain exemplary embodiments, address settings can be verified, for example, by pinging the addresses and detecting a response.

Figure 4:
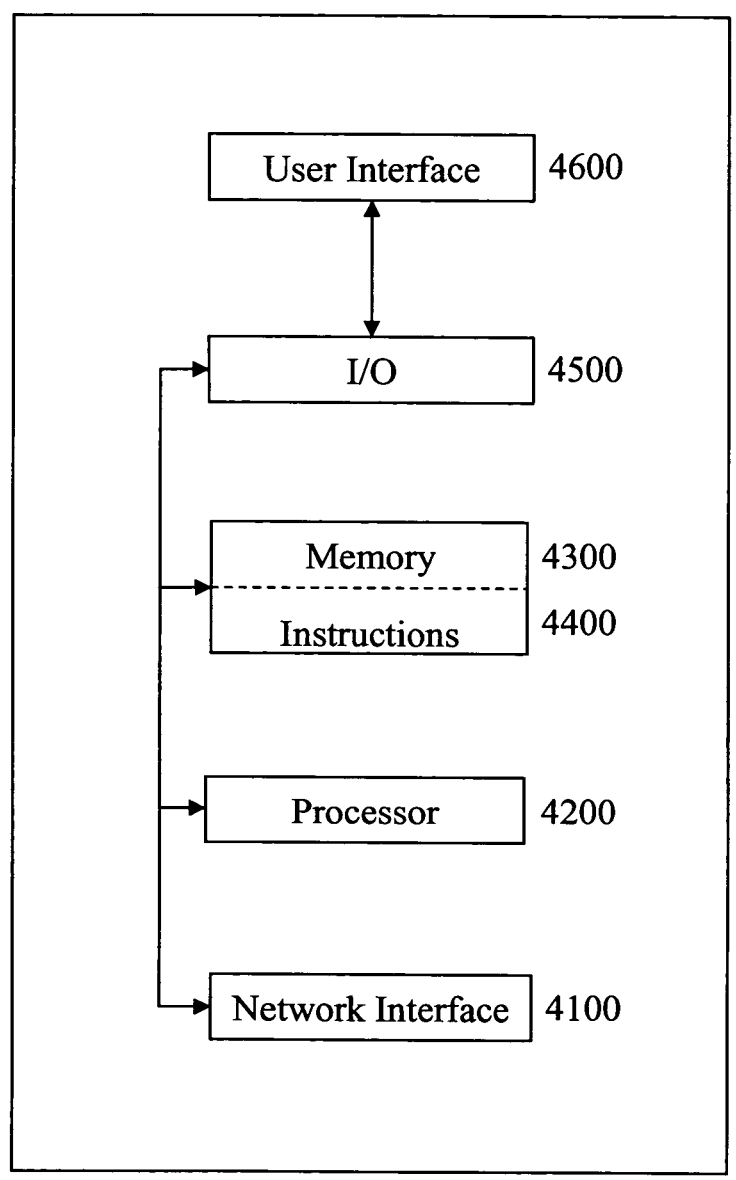
FIG. 4 is a block diagram of an exemplary embodiment of an information device 4000.

FIG. 4 is a block diagram of an exemplary embodiment of an information device 4000, which in certain operative embodiments can comprise, for example, information device 1500 and/or PLC 1100 of FIG. 1. Information device 4000 can comprise any of numerous well-known components, such as for example, one or more network interfaces 4100, one or more processors 4200, one or more memories 4300 containing instructions 4400, one or more input/output (I/O) devices 4500, and/or one or more user interfaces 4600 coupled to I/O device 4500, etc.

In certain exemplary embodiments, via one or more user interfaces 4600, such as a graphical user interface, a user can provide at least one of a possible plurality of settings adaptable to configure a network interface device to communicate with a first device on a process network and a second device on a non-process network.

FIG. 5 is a block diagram of an exemplary embodiment of a graphical user interface screen 5000. Graphical user interface screen 5000 can be one of a plurality of graphical user interface screens, generatable by network interface device configuration wizard to enforce user compliance with a predetermined sequence for configuring a network interface device. Graphical user interface screen 5000 can comprise a plurality of user interface elements, such as one or more textual, graphical, audio, video, animation, and/or haptic elements. In certain exemplary embodiments, for example, graphical user interface screen 5000 can comprise an outer window 5100, an intermediate box 5200, and/or an inner box 5300, etc. Outer window 5100, intermediate box 5200, and inner box 5300 can comprise text useful for enforcing user compliance in the configuration of the network interface device.

Graphical user interface screen 5000 can comprise various elements for user input, such as, a module position cell 5400. In certain exemplary embodiments, module position cell 5400 can be adaptable to accept a manual user entry of a logical position of the network interface device relative to the programmable controller. In certain exemplary embodiments, module position cell 5400 can be adaptable to automatically respond to the user activating a position increase button 5450 and/or a position decrease button 5475. Module position cell 5400 can, for example, display a letter and/or number indicative of a logical position.

Graphical user interface screen 5000 can comprise control buttons for executing sets of predetermined instructions adaptable to detect and/or configure at least one network interface device setting. For example, a read modules button 5500 can execute a particular set of predetermined instructions adaptable to detect a module position and/or other network interface device settings for display on a user interface device. Graphical user interface screen 5000 can display information related to at least one setting of the network interface device. For example, a position and module ID cell 5600 can indicate the logical position 5650 of the network interface device relative to a programmable logic controller and show a logical identification moniker 5675 of the network interface device.

Graphical user interface screen 5000 can comprise control buttons such as a back button 5700, a next button 5800, and/or a cancel button 5900. Back button 5700, next button 5800, and/or cancel button 5900 can be adaptable to allow the user to scroll through a predetermined sequential plurality of user interface screens, such as graphical user interface screen 5000, adaptable for use in the configuration of the network interface device. Scrolling through graphical user interface screens can enforce user compliance in the configuration of the network interface device.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a U.S. patent, U.S. patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A method for configuring a network interface device from an information device communicating with the network interface device via a network, the network interface device adaptable to connect a programmable logic controller to a network, said method comprising:
   providing a network interface device adaptable to communicatively couple a programmable logic controller to a network, the network interface device including network protocol layers, the network protocol layers including an OSI transport layer and one or more additional layers above the OSI transport layer;
   automatically enforcing, via a wizard at the information device, user compliance with a plurality of predetermined steps for a computer-assisted configuration of the network interface device, wherein the computer-assisted configuration is of the network interface device's OSI transport layer or any layer above the OSI transport layer;
   providing at least one setting to the network interface device from the information device via the network;
   receiving a setting of a logical position of the network interface device relative to the programmable logic controller; and
   operating a programmable logic controller on a network via the configured OSI transport layer or above of the network interface device.

2. The method of claim 1, further comprising:
   requesting from a user at the information device, for the at least one setting for the network interface device.

3. The method of claim 1, further comprising:
   receiving the at least one setting for the network interface device from a user at the information device.

4. The method of claim 1, further comprising:
   receiving a count of network connections for the network interface device.

5. The method of claim 1, further comprising:
   receiving a type for at least one network connection to the network interface device.

6. The method of claim 1, further comprising:
   determining the at least one setting for the network interface device.

7. The method of claim 1, further comprising:
   configuring the network interface device with the at least one setting.

8. The method of claim 1, further comprising:
   receiving a Q-address used by an input/output module attached to the programmable logic controller, the input/output module further couplable to the network interface device.

9. The method of claim 1, further comprising:
   verifying the at least one setting for the network interface device.

10. The method of claim 1, wherein the network interface device is adaptable to communicatively couple the programmable logic controller to an ethernet network.

11. The method of claim 1, wherein the network interface device is adaptable to communicatively couple the programmable logic controller to the Internet.

12. The method of claim 1, wherein said plurality of predetermined steps are adaptable to receive at least one e-mail client configuration setting.

13. The method of claim 1, wherein said plurality of predetermined steps are adaptable to receive at least one FTP client configuration setting.

14. The method of claim 1, wherein said plurality of predetermined steps are adaptable to receive at least one FTP server configuration setting.

15. The method of claim 1, wherein said plurality of predetermined steps are adaptable to receive at least one HTTP server configuration setting.

16. The method of claim 1, wherein said plurality of predetermined steps are adaptable to receive at least one FTP server login services setting.

17. The method of claim 1, wherein said plurality of predetermined steps are adaptable to receive at least one secure HTTP server login services setting.

18. The method of claim 1, wherein said plurality of predetermined steps are adaptable to validate an FTP server address.

19. The method of claim 1, wherein said plurality of predetermined steps are adaptable to receive at least one SMTP client configuration setting.

20. The method of claim 1, wherein said plurality of predetermined steps are adaptable to configure an e-mail message to at least one user.

21. The method of claim 1, wherein said plurality of predetermined steps are adaptable to validate an e-mail server address.

22. The method of claim 1, wherein said network interface device is adaptable to communicate process data from the programmable logic controller to a network.

23. The method of claim 1, wherein said plurality of predetermined steps comprises a help utility.

24. An apparatus for providing a wizard adaptable to configure a network interface device couplable to a programmable logic controller, said apparatus comprising:
    an input processor, including memory providing instructions to sequentially prompt a user for at least one setting for configuring the network interface device; and
    an output processor adapted to provide the at least one setting from the wizard to the network interface device via a network,
    wherein the network interface device includes network protocol layers, the network protocol layers include an OSI transport layer and one or more additional layers above the OSI transport layer;
    wherein configuring the network interface device includes configuring the network interface device's OSI transport layer or any layer above the OSI transport layer;
    wherein the at least one setting is a logical position of the network interface device relative to the programmable logic controller; and
    wherein the programmable logic controller operates on the network via the configured OSI transport layer or above.

25. A system comprising:
    a network interface device adaptable to communicatively couple a programmable logic controller to a network, the network interface device including network protocol layers, the network protocol layers including an OSI transport layer and one or more additional layers above the OSI transport layer;
    an information device, including memory providing instructions to communicate with the network interface device via a network, said information device providing a wizard comprising a plurality of predetermined steps adapted to configure the network interface device's OSI transport layer or any layer above the OSI transport layer;
    a setting associated with the network interface device, wherein the setting is a logical position of the network interface device relative to the programmable logic controller; and
    wherein the programmable logic controller operates on the network via the configured OSI transport layer or above.

26. A non-transitory machine-readable medium storing instructions for activities comprising:
    providing a network interface device including network protocol layers, the network protocol layers including an OSI transport layer and one or more additional layers above the OSI transport layer;
    providing, at an information device in communication with the network interface device via a network, a plurality of predetermined steps adapted to sequentially prompt a user for at least one setting for configuring the network interface device, wherein the at least one setting is a logical position of the network interface device relative to a programmable logic controller and wherein configuring the network interface device includes configuring the network interface device's OSI transport layer or any layer above the OSI transport layer;
    providing a plurality of predetermined steps to provide the at least one setting from the wizard at the information device to the network interface device via the network; and
    operating the programmable logic controller on the network via the configured OSI transport layer or above.

27. The method of claim 1, wherein the wizard is a combination of at least one of hardware, firmware, and software adaptable to guide a user through predetermined sequential steps of a task.

* * * * *